(12) United States Patent
Asada

(10) Patent No.: US 6,536,954 B2
(45) Date of Patent: Mar. 25, 2003

(54) OPTICAL CONNECTOR DEVICE

(75) Inventor: Kazuhiro Asada, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/987,414

(22) Filed: Nov. 14, 2001

(65) Prior Publication Data
US 2002/0061171 A1 May 23, 2002

(30) Foreign Application Priority Data
Nov. 17, 2000 (JP) ......................... 2000-351311

(51) Int. Cl.[7] .................................. G02B 6/38
(52) U.S. Cl. ..................... 385/60; 385/78; 385/72
(58) Field of Search ..................... 385/60, 78, 72, 385/69, 55, 84, 86

(56) References Cited

U.S. PATENT DOCUMENTS 4,762,388 A * 8/1988 Tanaka et al. ............... 387/78
6,007,256 A * 12/1999 Asada et al. ................ 385/59

FOREIGN PATENT DOCUMENTS

| JP | A 9-197185 | 7/1997 |
|----|-----------|--------|
| JP | A 9-211263 | 8/1997 |
| JP | A 9-222535 | 8/1997 |
| JP | A 2001-91791 | 4/2001 |

* cited by examiner

Primary Examiner—Phan T. H. Palmer
(74) Attorney, Agent, or Firm—Oliff & Berridge, PLC

(57) ABSTRACT

There is provided a first optical connector 11 in which ferrule portions 11b are disposed to protrude from ferrule protection walls 11c, a second optical connector 12 in which ferrule portions 12b are disposed to protrude from ferrule protection walls 12c, and a relay adapter 13 including retaining holes 13d with which retaining protrusions 11f of the first optical connector 11 are engaged in a withdrawal-preventing manner and retaining holes 13d with which retaining protrusions 12f of the second optical connector 12 are detachably engaged.

2 Claims, 4 Drawing Sheets

OPTICAL CONNECTOR DEVICE

BACKGROUND OF THE INVENTION

1. Filed of the Invention

This invention relates to an optical connector device for connecting optical fiber cords with each other in the field of optical communication between equipments in an OA (office automation) system, an FA (factory automation) system, an automobile or the like.

2. Description of the Related Art

Examples of conventional optical connector devices for optically coupling optical fiber cords with each other includes the type, as disclosed in JP-A-9-222535, in which optical connectors each holding the optical fiber cord, are coupled with each other through a relay adapter.

More specifically, as shown in FIG. 5, each of the optical connectors 1 and 2 includes a pair of ferrule portions 1b, 2b which are provided at a connection side of a connector body 1a, 2a, molded of a resin or the like, and hold the optical fiber cords 3 inserted therein, respectively. Ferrule protection walls 1c, 2c of an approximately square tubular shape are formed, respectively, around the ferrule portions 1b, 2b in surrounding relation thereto in such a manner that a suitable clearance is formed between each ferrule protection wall and an outer peripheral surface of the corresponding ferrule portion. The ferrule portions 1b, 2b project from the ferrule protection walls 1c, 2c, respectively.

The ferrule protection walls 1c, 2c of each optical connector 1, 2 are interconnected by an interconnecting portion 1d, 2d, and guide projections 1e, 2e for fitting guide purposes with respect to fitting portions 5a provided at opposite end portions of the relay adapter 5, respectively, are formed, respectively, on the outer peripheral surfaces of the ferrule protection walls 1c, 2c.

Retaining projections (not shown) detachably engaging with retaining holes 5b formed in the fitting portions 5a of the relay adapter 5 is formed on a lower surface of the interconnecting portion 1d, 2d. An elastic retaining portion if, 2f extends from a central portion of an upper portion of the connector body 1a, 2a into a space between the two ferrule protection walls 1c, 2c, and an upwardly-projecting retaining projection 1g, 2g is formed at a distal end of this elastic retaining portion 1f, 2f, and these retaining projections are detachably engaged with retaining holes 5c formed in the fitting portions 5a.

An operating portion 1h, 2h is formed on a central portion of each elastic retaining portion 1f, 2f, and by depressing this operating portion 1h, 2h, the retaining engagement of the retaining projection 1g, 2g of the elastic retaining portion 1f, 2f with the retaining hole 5c in the relay adapter 5 can be canceled.

Ferrule fitting tubular portions 5d are provided at an intermediate portion of the interior of the relay adapter 5, and when the ferrule protection walls 1c, 2c of each optical connector 1, 2 are fitted into the corresponding fitting portion 5a, the ferrule portions 1b, 2b are fitted respectively into these ferrule fitting tubular portions, so that each of these ferrule fitting tubular portion intrudes into a space between the corresponding ferrule protection wall 1c, 2c and ferrule portion 1b, 2b. Screw fastening portions 5e are formed respectively on opposite (right and left) side surfaces of the relay adapter 5 at a central portion thereof.

When the ferrule protection walls 1c, 2c of each optical connector 1, 2 are fitted into the corresponding one of the fitting portions 5a formed respectively at the opposite end portions of the relay adapter 5, the ferrule portions 1b, 2b are fitted respectively into the ferrule fitting tubular portions 5d, and when the retaining projections 1g and 2g are brought into retaining engagement with the retaining holes 5c, respectively, end surfaces of the optical fiber cords 3 held respectively in the ferrule portions 1b of the optical connector 1 are joined and optically coupled respectively to end surfaces of the optical fiber cords 3 held respectively in the ferrule portions 2b of the optical connector 2.

In the above optical connector device according to the related construction, the ferrule portions 1b, 2b of each optical connector 1, 2 project from the ferrule protection walls 1c, 2c, respectively, and therefore there was a possibility that the distal ends of the ferrule portions 1b and 2b, subjected to an end processing, and the distal ends of the optical fiber cords 3 were accidentally contacted to undergo contact damage or damage due to contamination during the transport, the connecting/disconnecting operation or others.

SUMMARY OF THE INVENTION

With the above problem in view, it is an object of this invention to provide an optical connector device in which damage of ferrule portions and distal ends of optical fiber cords, held in these ferrule portions, due to contact or the like, is effectively prevented.

According to first technical means for solving the above problem, there is provided an optical connector device comprising:

a first optical connector having a ferrule portion holding an end portion of an optical fiber cord;

a second optical connector having a ferrule portion holding another optical fiber cord for being optically coupled to the optical fiber cord; and a relay adapter for connecting the first optical connector and the second optical connector with each other, wherein the optical fiber cord is optically coupled to the another optical fiber cord by connecting the first optical connector and the second optical connector with each other through the relay adapter;

the first optical connector includes a ferrule protection wall surrounding an outer peripheral surface of the ferrule portion of the first optical connector to have a space therebetween;

the ferrule portion of the first optical connector projects from the ferrule protection wall of the first optical connector;

the second optical connector includes a ferrule protection wall surrounding an outer peripheral surface of the ferrule portion of the second optical connector to have a space therebetween;

the ferrule protection wall of the second optical connector projects from the ferrule portion of the second connector;

the relay adapter has, at one end thereof, a fitting portion into which the ferrule protection wall of the first optical connector is fitted and a retained portion with which a retaining portion provided at the first optical connector is engaged in a withdrawal-preventing manner;

the relay adapter has, at the other end thereof, another fitting portion into which the ferrule protection wall of the second optical connector is fitted and another retained portion with which another retaining portion provided at the second optical connector is detachably engaged; and the relay adapter has, at an intermediate portion of the interior thereof, a ferrule fitting tubular portion into which the ferrule portion of the first optical connector and the ferrule portion of the second optical connector are fitted in such a manner that the ferrule fitting tubular portion intrudes into a space between each of said ferrule protection walls and the corresponding ferrule portion.

According to second technical means for solving the above problem, there is provided an optical connector device comprising:

a first optical connector member having a ferrule portion holding an end portion of an optical fiber cord; and a second optical connector member having a ferrule portion holding another optical fiber cord for being optically coupled to the optical fiber cord, wherein the optical fiber cord is optically coupled to the another optical fiber cord by connecting the first optical connector member and the second optical connector member with each other;

the second optical connector member includes a ferrule protection wall surrounding an outer peripheral surface of the ferrule portion to have a space therebetween;

the ferrule protection wall of the second optical connector member projects from the ferrule portion of the second optical connector member; and the first optical connector member comprises a first optical connector and a relay adapter;

a retaining portion provided at the first optical connector is engaged with a retained portion provided at the relay adapter in a withdrawal-preventing manner;

the first optical connector includes the ferrule portion of the first optical connector member and a ferrule protection wall surrounding an outer peripheral surface of the ferrule portion of the first optical connector member to have a space therebetween and is disposed the ferrule portion of the first optical connector member therein to project from the ferrule protection wall of the first optical connector; and the relay adapter has, at one end thereof, a fitting portion into which the ferrule protection wall of the first optical connector is fitted and has, at the other end portion thereof, another fitting portion, into which the ferrule protection wall of the second optical connector member is fitted and a retained portion with which a retaining portion provided at the second optical connector member is detachably engaged and has, at an intermediate portion of the interior thereof, a ferrule fitting tubular portion into which the ferrule portion of the fitted first optical connector is fitted in such a manner that the ferrule fitting tubular portion intrudes into a space between the ferrule protection wall the first optical connector member and the ferrule portion of the first optical connector and into which the ferrule portion of the second optical connector member is fitted in such a manner that that ferrule fitting tubular portion intrudes into a space between the ferrule protection wall of the second optical connector member and the ferrule portion of the second optical connector member.

DETAILED DESCRIPTION OF THE PREFERRED EMBODIMENTS

Figure 1:
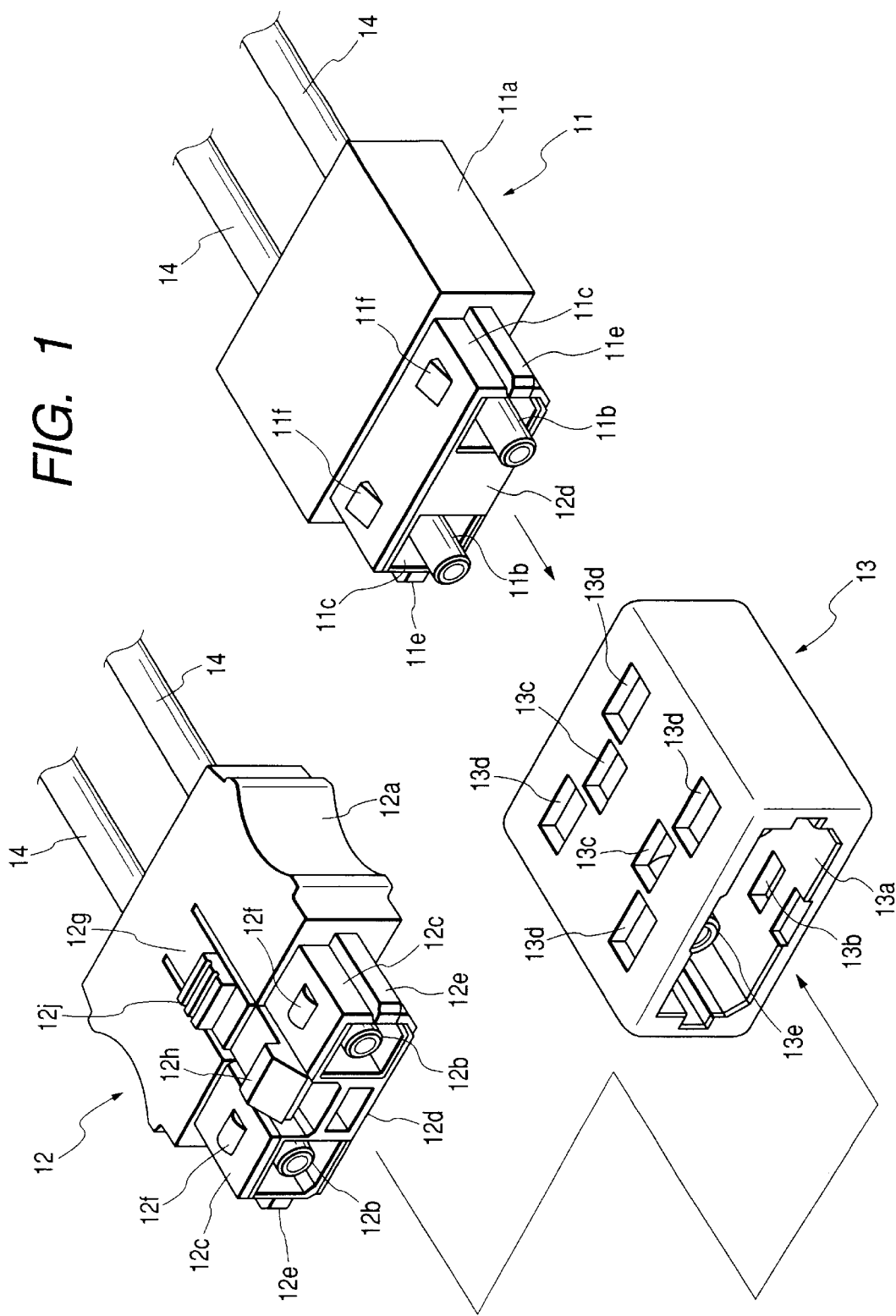
FIG. 1 is an exploded perspective view of an embodiment of the present invention.

A preferred embodiment of the present invention will now be described with reference to the drawings. As shown in FIGS. 1 to 4, this construction comprises a first optical connector 11, a second optical connector 12 (second optical connector member), and a relay adapter 13, which are molded of a resin or the like.

As well as the above described, each of optical connectors 11 and 12 includes a pair of ferrule portions 11b, 12b which are provided integrally at a connection side of a connector body 11a, 12a, respectively and hold optical fiber cords 14 inserted therein, respectively. Each of optical 1 connectors 11, 12 integrally comprises ferrule protection wall 11c, 12c having a approximately square tubular shape and surrounding a periphery of the ferrule portion 11b, 12b so that a suitable clearance is formed between each of ferrule protection wall and an outer peripheral surface of the corresponding ferrule portion.

In the first optical connector 11, the ferrule portions 11b project from the ferrule protection walls 11c, respectively, and in contrast, the ferrule protection walls 12c of the second optical connector 12 project slightly from the ferrule portions 12b, respectively.

The ferrule protection wall 11c, 12c of each optical connector 11, 12 is interconnected by an interconnecting portion 11d, 12d, and guide projection 11e, 12e for fitting guide with respect to fitting portions 13a provided at opposite end portions of the relay adapter 13, respectively , are formed respectively on both sides of the outer peripheral surfaces of the ferrule protection walls 11c, 12c.

Retaining projections (not shown) are formed on lower surfaces of the interconnecting portions 11d, 12d and the retaining projections are detachably engaged with retaining holes 13b serving as retaining portions and formed in lower portions of the both fitting portions 13a of the relay adapter 13.

In this case, the retaining projection on the first optical connector 11 is formed into a wedge-shape similar to retaining projections 11f having a triangular wedge-shape in a cross section and formed on upper surface of the ferrule protection wall 11c, and the retaining projection is retainingly engaged with the retaining hole 13b in a withdrawal-preventing manner. The retaining projection on the second optical connector 12 is formed into a drum-shape similar to retaining projections 12f formed on an upper surface of the ferrule protection walls 12c and bulging in a drum-like configuration, and th retaining projection can be detachably engaged with the retaining hole 13b.

An elastic retaining portion 12g extends from a central portion of an upper portion of the connector body 12a of the second optical connector 12 into a space between the two ferrule protection walls 12c, and an upwardly-projecting retaining projection 12h is formed at a distal end of this elastic retaining portion 12g, and this retaining projection is detachably engaged with a retaining hole 13c serving as a retaining portion and formed in an upper portion of the fitting portion 13a. An operating portion 12j is formed on a central portion of the elastic retaining portion 12g, and by depressing this operating portion 12g, the retaining engagement of the retaining projection 12h of the elastic retaining portion 12g with the retaining hole 13c in the relay adapter 13 can be canceled.

Retaining holes 13d serving as retaining portions are formed through the upper wall of the relay adapter 13, and when the ferrule protection walls 11c, 12c are fitted in the corresponding fitting portions 13a, the retaining projections 11f, 12f are engaged with the retaining holes 13d, respectively.

In this case, the retaining projections 11f on the first optical connector 11 are engaged with the retaining holes 13d in a withdrawal-preventing manner, respectively, and the retaining projections 12f on the second optical connector 12 are detachably engaged with the retaining holes 13d, respectively.

Ferrule fitting tubular portions 13e are provided integrally at an intermediate portion of the interior of the relay adapter 13 and when the ferrule protection walls 11c, 12c of each optical connector 11, 12 are fitted into the corresponding fitting portion 13a, the ferrule portions 11b, 12b are fitted into the ferrule fitting tubular portions 13e, respectively, so that each of the ferrule fitting tubular portion 13e relatively intrudes into a space between the corresponding ferrule protection wall 11c, 12c and ferrule portion 11b, 12b.

Figure 2:
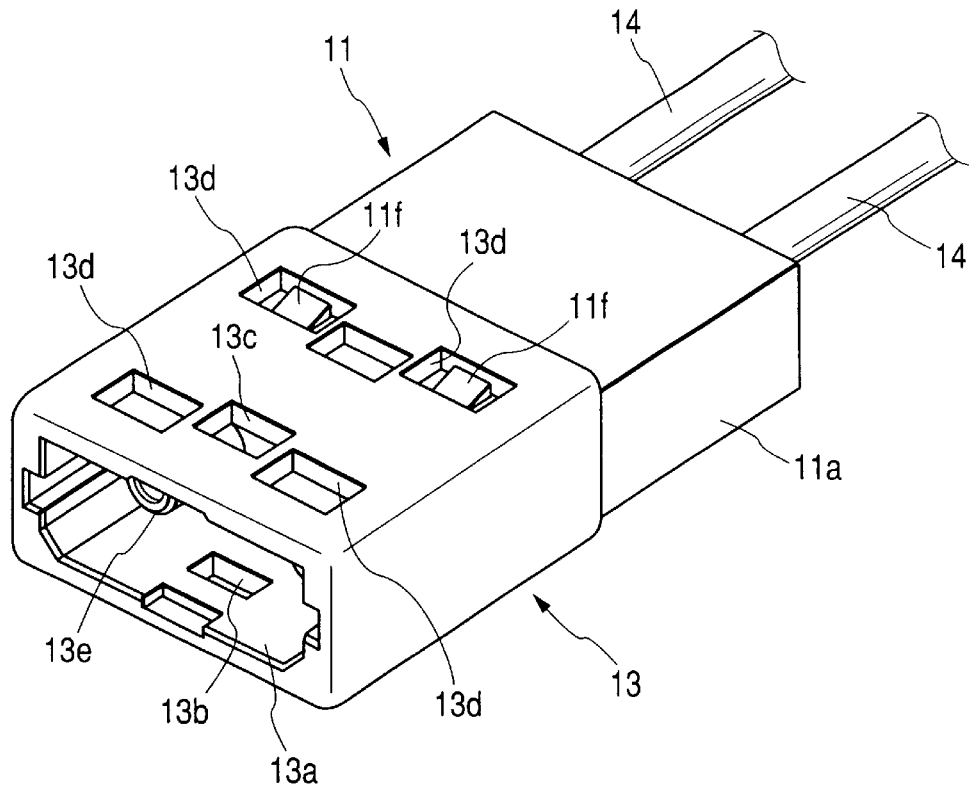
FIG. 2 is a perspective view showing a condition in which a first optical connector and a relay adapter are connected with each other.
Figure 3:
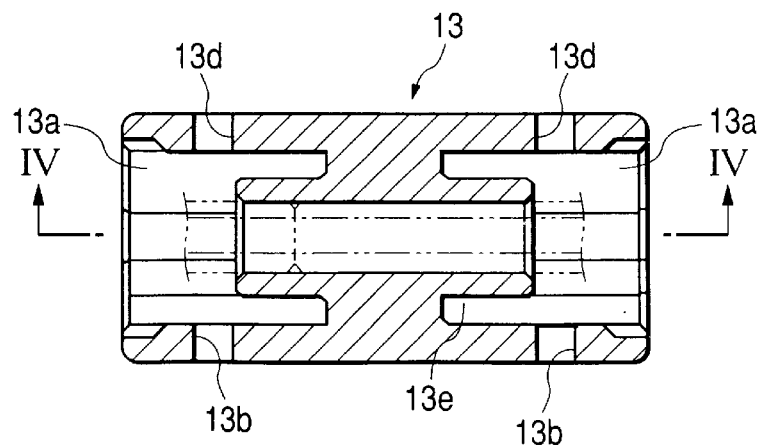
FIG. 3 is a cross-sectional view of a relay adapter.
Figure 4:
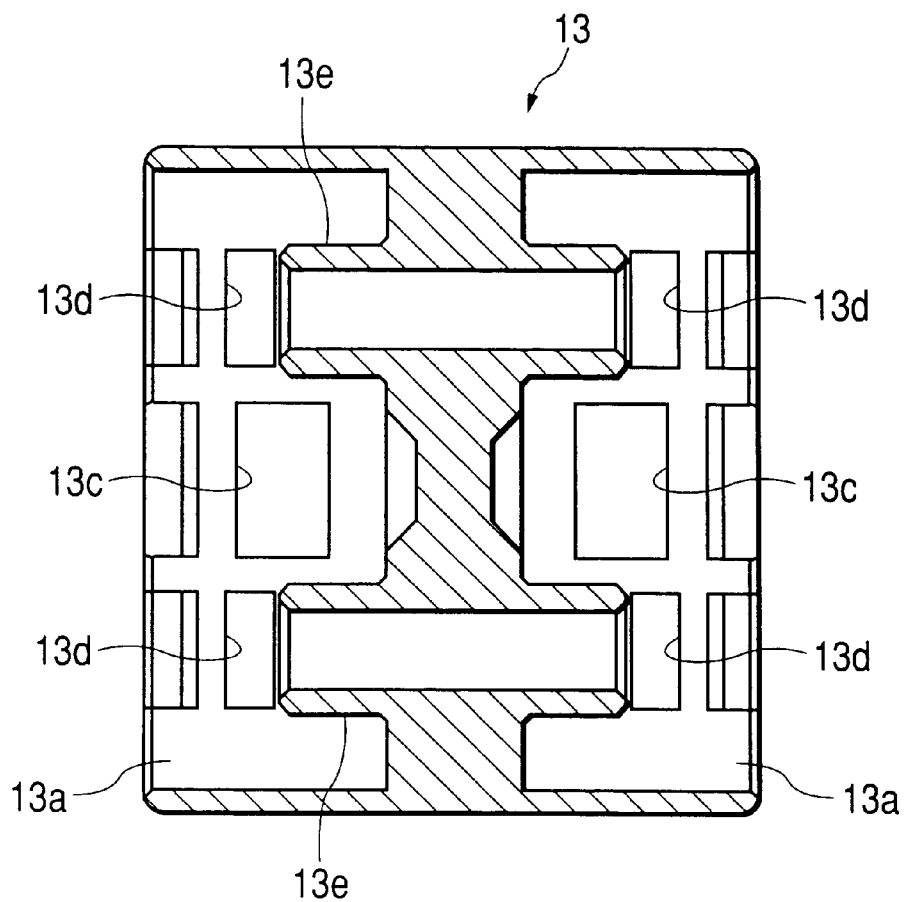
FIG. 4 is a cross-sectional view taken along the line IV—IV of FIG. 3.
Figure 5:
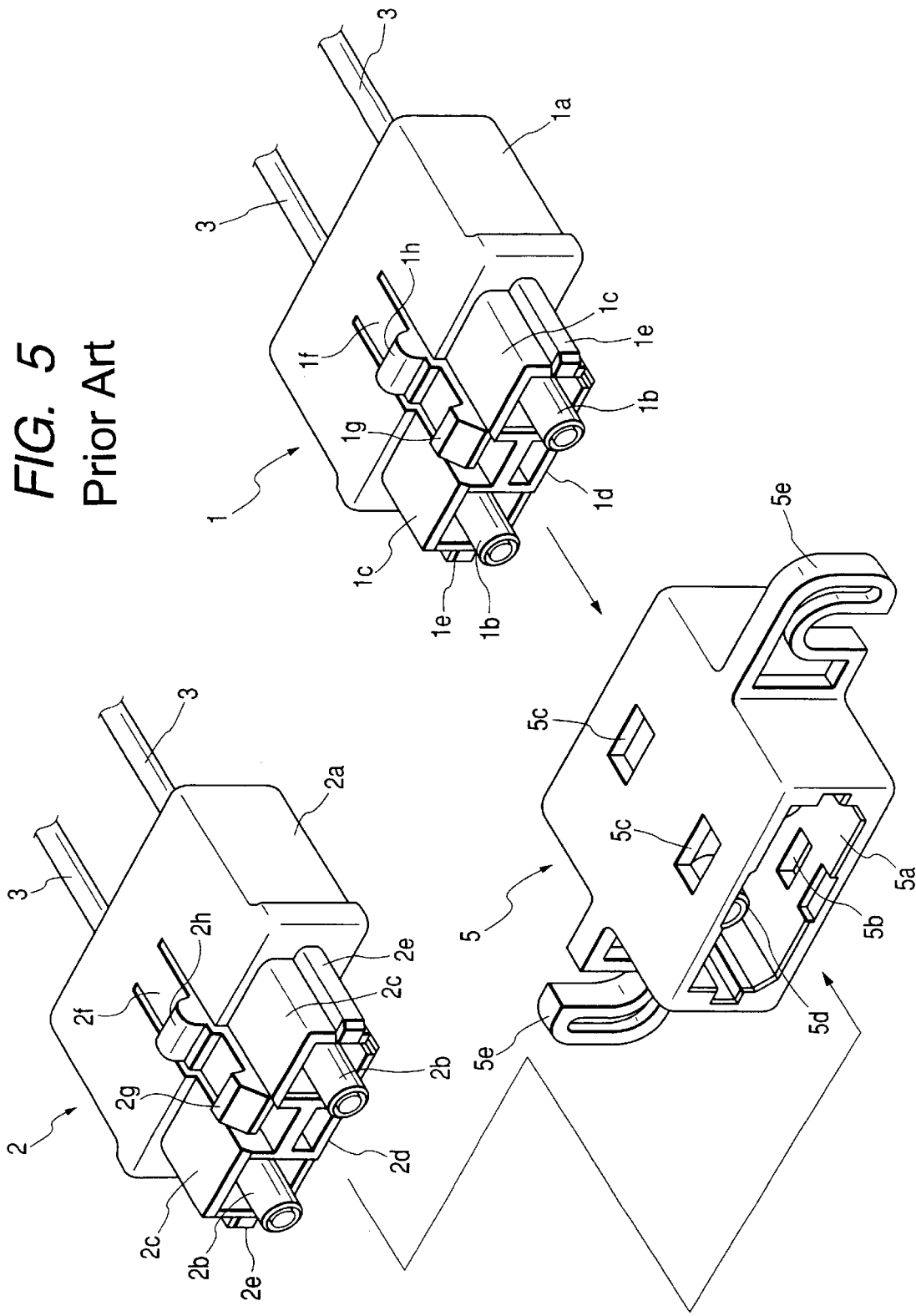
FIG. 5 is an exploded perspective view of an example according to a related art.

When the first optical connector 11, the second optical connector 12 and the relay adapter 13 are to be used, the first optical connector 11 is used in such a condition that its ferrule protection walls 11c are fitted in the fitting portion 13a of the relay adapter 13, as shown in FIG. 2.

Namely, when the ferrule protection walls 11c are fitted into the fitting portion 13a, each of ferrule portions 11b is fitted into each of ferrule fitting tubular portions 13e and the both retaining projections 11f formed on the upper surfaces of the ferrule protection walls 11c and the retaining projection on the lower surface are engaged with the both retaining holes 13d and the retaining hole 13b in a withdrawal-preventing manner, respectively and therefore there is provided a first optical connector member formed by integrating the first optical connector 11 and the relay adapter 13 with each other.

The optical fiber cords 14 are optically coupled with each other by connecting this integrated first optical connector member and the second optical connector 12 with each other.

Namely, when the both ferrule protection walls 12c of the second optical connector 12 are fitted into the fitting portion 13a of the integrated first optical connector member, the ferrule portions 12b are fitted into the ferrule fitting tubular portions 13e, in which the ferrule portions 11b have already been fitted, from the opposite side and the both retaining projections 12f formed on the upper surfaces of the ferrule protection walls 12c and the retaining portion on the lower surface are detachably engaged with the retaining holes 13d and the retaining hole 13b, respectively, and the retaining projection 12h of the elastic retaining portion 12g is detachably engaged with the retaining hole 13c, and end surfaces of the optical fiber cords 14 held in the ferrule portions 11b of the first optical connector 11 are joined and optically coupled to end surfaces of the optical fiber cords 14 held in the ferrule portions 12b of the second optical connector 12 within the ferrule fitting tubular portions 13e.

In a case of separation for maintenance or the like, when the first optical connector 11 and the second optical connector 12 are pulled away from each other in directions where separating from each other, respectively while the operating portion 12j is depressed to cancel the engagement of the retaining projection 12h with the retaining hole 13c, the engagement of the retaining projections 12f and the retaining projection formed on the second optical connector 12 with the retaining holes 13d and the retaining hole 13b in the relay adapter 13 are canceled since the retaining projections 11f and the retaining projection formed on the first optical connector 11 are engaged with the retaining holes 13d and retaining hole 13b in the relay adapter 13 in a withdrawal-preventing manner, respectively, and therefore the second optical connector 12 is separated from the first optical connector member.

As described above, in this embodiment, the first optical connector 11 and the relay adapter 13 are connected with each other in a withdrawal-preventing manner, and the first optical connector 11 is used in such a condition that the relay adapter 13 is connected to the first optical connector 11 in an integrated manner, and therefore although the ferrule portions 11b project from the ferrule protection walls 11c, respectively when the first optical connector 11 is in an independent condition, the ferrule portions 11b and the distal end portions of the optical fiber cords 14 held therein are covered with the ferrule fitting tubular portions 13e and the other end-side fitting portion 13a when the first optical connector is in the above integrated condition. Therefore, during the transport, the connecting/disconnecting operation or the like, the impingement of other member and the contact of the hand of a man can be prevented, and contact damage due to such contact or the like, as well as damage due to contamination, can be effectively prevented. On the other hand, processing of the ends of the optical fiber cords 14 at the distal ends of the ferrule portions 11b can be effected when the first optical connector 11 is in the independent condition, and therefore this end processing can be easily carried out.

Besides, the ferrule portions 11b of the first optical connector 11 can be formed in a projected condition, and therefore, even if the ferrule portions 12b of the second optical connector 12 do not project from the ferrule protection walls 12c, the optical coupling between the optical fiber cords 14 can be obtained. In the second optical connector 12, each of ferrule portions 12b and the distal end portions of the optical fiber cord 14 held therein do not project from each of ferrule protection wall 12c and as well as the above described, the impingement of other member and the contact of the hand of a man can be prevented and contact damage due to such contact or the like and damage due to contamination can be effectively prevented. In this case, the distal end of each of the ferrule portions 12b is disposed slightly inwardly of the corresponding ferrule protection wall 12c, and any difficulty is not encountered with the processing of the end of the optical fiber cord 14 at the distal end of the ferrule portion 12b.

Although the above embodiment is directed to the optical connector device of a two-pole type, it may be an optical connector device of a single-pole or a multi-pole type such as three-pole type or the like and the invention is not limited to the above embodiment.

As well as the above described, screw fastening portions 5e may be formed on the opposite (right and left) side surfaces of the relay adapter 13 at a central portion thereof, respectively.

As described above, according the optical connector device of the present invention, the first optical connector includes the ferrule protection walls each surrounding the outer peripheral surface of the corresponding ferrule portion to have a space therebetween and is disposed the ferrule portion therein to project from the ferrule protection wall, and the second optical connector includes the ferrule protection walls each surrounding the outer peripheral surface of the corresponding ferrule portion to have a space therebetween and is disposed the ferrule protection wall therein to project from the ferrule portion, and the relay adapter has at one end thereof the fitting portion into which the ferrule protection walls of the first optical connector is fitted and the retained portions with which the retaining portions provided at the first optical connector are engaged, respectively, in a withdrawal-preventing manner, and the relay adapter has at the other end portion thereof the fitting portion into which the ferrule protection walls of the second optical connector is fitted and the retained portions with which the retaining portions provided at the second optical connector are detachably engaged, respectively, and the relay adapter has at the intermediate portion of the interior thereof the ferrule fitting tubular portions and each ferrule portion of the fitted first optical connector and each ferrule portion of the second optical connector are fitted into the corresponding ferrule fitting tubular portion in such a manner that the ferrule fitting tubular portion intrudes into the space between each of the ferrule protection walls and the corresponding ferrule portion. The second optical connector member includes the ferrule protection walls each surrounding the outer peripheral surface of the corresponding ferrule portion to have a space therebetween and is disposed the ferrule protection wall therein to project from the ferrule portion, and the first optical connector member comprises the first optical connector including the ferrule portions and the ferrule protection walls each surrounding the outer peripheral surface of the corresponding ferrule portion to have a space therebetween, the ferrule portion projecting from the ferrule protection wall, and the relay adapter which has at one end thereof the fitting portion into which the ferrule protection walls of the first optical connector are fitted, and further has at the other end portion thereof the fitting portion into which the ferrule protection walls of the second optical connector are fitted, and the retained portions with which the retaining portions provided at the second optical connector are detachably engaged, respectively, and further has at the intermediate portion of the interior thereof the ferrule fitting tubular portions and each ferrule portion of the fitted first optical connector is fitted in the corresponding ferrule fitting tubular portion in such a manner that the ferrule fitting tubular portion intrudes into the space between the ferrule protection wall and the ferrule portion and each ferrule portion of the second optical connector is fitted into the corresponding ferrule fitting tubular portion in such a manner that the ferrule fitting tubular portion intrudes into the space between the ferrule protection wall and the ferrule portion, and the retaining portions provided at the first optical connector are engaged respectively with the retaining portions provided at the relay adapter in a withdrawal-preventing manner. Therefore, there is achieved an advantage that damage of the ferrule portions and the distal ends of the optical fiber cords, held in these ferrule portions due to contact or the like can be effectively prevented.

What is claimed is:

1. An optical connector device comprising:
   a first optical connector having a ferrule portion holding an end portion of an optical fiber cord;
   a second optical connector having a ferrule portion holding another optical fiber cord for being optically coupled to the optical fiber cord; and
   a relay adapter for connecting the first optical connector and the second optical connector with each other,
   wherein the optical fiber cord is optically coupled to the another optical fiber cord by connecting the first optical connector and the second optical connector with each other through the relay adapter;
   the first optical connector includes a ferrule protection wall surrounding an outer peripheral surface of the ferrule portion of the first optical connector to have a space therebetween;
   the ferrule portion of the first optical connector projects from the ferrule protection wall of the first optical connector;
   the second optical connector includes a ferrule protection wall surrounding an outer peripheral surface of the ferrule portion of the second optical connector to have a space therebetween;
   the ferrule protection wall of the second optical connector projects from the ferrule portion of the second connector;
   the relay adapter has, at one end thereof, a fitting portion into which the ferrule protection wall of the first optical connector is fitted and a retained portion with which a retaining portion provided at the first optical connector is engaged in a withdrawal-preventing manner;
   the relay adapter has, at the other end thereof, another fitting portion into which the ferrule protection wall of the second optical connector is fitted and another retained portion with which another retaining portion provided at the second optical connector is detachably engaged; and
   the relay adapter has, at an intermediate portion of the interior thereof, a ferrule fitting tubular portion into which the ferrule portion of the first optical connector and the ferrule portion of the second optical connector are fitted in such a manner that the ferrule fitting tubular portion intrudes into a space between each of said ferrule protection walls and the corresponding ferrule portion.

2. An optical connector device comprising:
   a first optical connector member having a ferrule portion holding an end portion of an optical fiber cord; and
   a second optical connector member having a ferrule portion holding another optical fiber cord for being optically coupled to the optical fiber cord,
   wherein the optical fiber cord is optically coupled to the another optical fiber cord by connecting the first optical connector member and the second optical connector member with each other;
   the second optical connector member includes a ferrule protection wall surrounding an outer peripheral surface of the ferrule portion to have a space therebetween;
   the ferrule protection wall of the second optical connector member projects from the ferrule portion of the second optical connector member; and
   the first optical connector member comprises a first optical connector and a relay adapter;
   a retaining portion provided at the first optical connector is engaged with a retained portion provided at the relay adapter in a withdrawal-preventing manner;
   the first optical connector includes the ferrule portion of the first optical connector member and a ferrule protection wall surrounding an outer peripheral surface of the ferrule portion of the first optical connector member to have a space therebetween and is disposed the ferrule portion of the first optical connector member therein to project from the ferrule protection wall of the first optical connector; and the relay adapter has, at one end thereof, a fitting portion into which the ferrule protection wall of the first optical connector is fitted and has, at the other end portion thereof, another fitting portion, into which the ferrule protection wall of the second optical connector member is fitted and a retained portion with which a retaining portion provided at the second optical connector member is detachably engaged and has, at an intermediate portion of the interior thereof, a ferrule fitting tubular portion into which the ferrule portion of the fitted first optical connector is fitted in such a manner that the ferrule fitting tubular portion intrudes into a space between the ferrule protection wall the first optical connector member and the ferrule portion of the first optical connector and into which the ferrule portion of the second optical connector member is fitted in such a manner that ferrule fitting tubular portion intrudes into a space between the ferrule protection wall of the second optical connector member and the ferrule portion of the second optical connector member.

* * * * *